US007932487B2

(12) United States Patent
Kovtoun et al.

(10) Patent No.: US 7,932,487 B2
(45) Date of Patent: Apr. 26, 2011

(54) MASS SPECTROMETER WITH LOOPED ION PATH

(75) Inventors: Viatcheslav V. Kovtoun, Santa Clara, CA (US); Alexander Alekseevich Makarov, Cheadle Hulme (GB)

(73) Assignee: Thermo Finnigan LLC, San Jose, CA (US)

( * ) Notice: Subject to any disclaimer, the term of this patent is extended or adjusted under 35 U.S.C. 154(b) by 155 days.

(21) Appl. No.: 12/013,352

(22) Filed: Jan. 11, 2008

(65) Prior Publication Data

US 2009/0179150 A1 Jul. 16, 2009

(51) Int. Cl.
*B01D 59/44* (2006.01)

(52) U.S. Cl. ........ 250/282; 250/281; 250/283; 250/291; 250/293; 250/296

(58) Field of Classification Search .................. 250/281, 250/282, 283, 286, 287, 288, 290, 291, 293, 250/294, 295, 296, 297, 298, 299
See application file for complete search history.

(56) References Cited

U.S. PATENT DOCUMENTS

| | | | | |
|---|---|---|---|---|
| 6,300,625 | B1 * | 10/2001 | Ishihara | 250/287 |
| 6,504,148 | B1 * | 1/2003 | Hager | 250/282 |
| 6,570,153 | B1 | 5/2003 | Li et al. | |
| 6,720,554 | B2 | 4/2004 | Hager | |
| 6,867,414 | B2 * | 3/2005 | Buttrill, Jr. | 250/287 |
| 6,949,736 | B2 * | 9/2005 | Ishihara | 250/282 |
| 6,949,738 | B2 * | 9/2005 | Yamaguchi et al. | 250/287 |
| 7,145,133 | B2 | 12/2006 | Thomson | |
| 7,211,792 | B2 * | 5/2007 | Yamaguchi | 250/287 |
| 7,355,168 | B2 * | 4/2008 | Yamaguchi | 250/282 |
| 7,482,583 | B2 * | 1/2009 | Ueno | 250/287 |
| 7,501,620 | B2 * | 3/2009 | Ogawa et al. | 250/281 |
| 7,504,620 | B2 * | 3/2009 | Sato et al. | 250/287 |
| 7,514,675 | B2 * | 4/2009 | Yamaguchi | 250/287 |
| 2003/0189171 | A1 * | 10/2003 | Londry et al. | 250/292 |
| 2005/0045817 | A1 * | 3/2005 | Yamaguchi et al. | 250/287 |
| 2005/0077462 | A1 * | 4/2005 | Yamaguchi et al. | 250/287 |
| 2005/0151076 | A1 * | 7/2005 | Yamaguchi et al. | 250/291 |
| 2005/0194528 | A1 * | 9/2005 | Yamaguchi et al. | 250/287 |
| 2005/0247869 | A1 * | 11/2005 | Yamaguchi | 250/287 |
| 2007/0138383 | A1 * | 6/2007 | Dowell et al. | 250/281 |
| 2008/0210862 | A1 * | 9/2008 | Yamaguchi et al. | 250/291 |
| 2009/0014641 | A1 * | 1/2009 | Bateman et al. | 250/282 |
| 2009/0314934 | A1 * | 12/2009 | Brown | 250/282 |
| 2010/0108879 | A1 * | 5/2010 | Bateman et al. | 250/283 |

FOREIGN PATENT DOCUMENTS

| | | | |
|---|---|---|---|
| JP | 2004281350 | A * | 10/2004 |
| WO | 2001143654 | A | 5/2001 |
| WO | WO 2007/122378 | A2 | 11/2007 |
| WO | WO 2007/122381 | A2 | 11/2007 |

* cited by examiner

*Primary Examiner* — Bernard E Souw
*Assistant Examiner* — Michael J Logie
(74) *Attorney, Agent, or Firm* — Charles B. Katz

(57) ABSTRACT

A mass spectrometer includes at least one ion selector, at least one collision cell, and an ion path switching device arranged to define a looped ion path around which ions derived from a sample may be sent multiple times (without reversal of ion travel) in order to effect a desired number of isolation/fragmentation cycles for MSn analysis. When the desired number of isolation/fragmentation cycles have been completed, the ion path switching device directs the ions to a detector or a separate mass analyzer for acquisition of a mass spectrum.

4 Claims, 5 Drawing Sheets

MASS SPECTROMETER WITH LOOPED ION PATH

FIELD OF THE INVENTION

The present invention relates generally to mass spectrometers, and more particularly to mass spectrometers capable of performing multiple stages of ion isolation and fragmentation.

BACKGROUND OF THE INVENTION

Triple quadrupole mass spectrometry is a well-established and widely used technique for analysis of a variety of substances, including small molecules such as pharmaceuticals and their metabolites, and large molecules such as peptides. Roughly described, a triple quadrupole mass spectrometer consists of two quadrupole mass filters separated by a collision cell. Each of the quadrupole mass filters is constructed from a set of rod electrodes to which oscillatory (e.g., radio-frequency (RF)) and direct current (DC) voltages are applied. The relative magnitudes of the applied RF and DC voltages are varied to adjust the range of mass-to-charge values (m/z's) for which ions are transmitted through the quadrupole mass filter. The collision cell may take the form of another set of rod electrodes, located within a gas-filled enclosure, to which only RF voltages are applied. Ions transmitted through the first quadrupole mass filter (commonly designated as Q1) are accelerated into the collision cell (designated as Q2), where they undergo energetic collisions with molecules or atoms of the collision gas (typically nitrogen or argon) and fragment into product ions by collisionally induced dissociation (CID). The product ions then pass into the second quadrupole mass analyzer (designated as Q3), and the selectively transmitted product ions subsequently strike a detector, which produces a signal representative of the abundance of the transmitted ions. By appropriately controlling the RF and DC voltages applied to Q1 and Q3, different operational modes (e.g., product scans, precursor scans, neutral loss scans, and selective reaction monitoring) may be selected. For example, in the product scan mode, Q1 is operated in a temporally-fixed condition such that it transmits only ions having m/z's within a range corresponding to a precursor ion of interest, while Q3 is scanned (i.e., the m/z range of transmitted ions is temporally ramped) to produce a mass spectrum of the product ions generated by fragmentation of the precursor ion of interest. Another commonly used operational mode for triple quadrupole mass spectrometers is selective-reaction monitoring, whereby complex samples may be screened for the presence of known compounds with high selectivity by operating both Q1 and Q3 in a fixed condition, such that Q1 transmits only ions within an m/z range corresponding to the precursor ion arising from the known compound, and Q3 transmits only ions within a m/z range corresponding to one of its characteristic product ions.

Conventional triple quadrupole mass spectrometers are limited to a single stage of ion selection and fragmentation, commonly referred to as MS/MS analysis. For many applications, it is desirable or necessary to conduct additional stages of ion selection and fragmentation in order to acquire information regarding the m/z's of second or subsequent generation product ions. This information may be useful, for example, for increasing the selectivity of metabolite or drug screening studies, or for providing additional structural elucidation that assists in the sequencing or identification of peptides and other biomolecules. Mass spectrometric analysis of substances utilizing two or more selection/fragmentation stages (referred to herein as MSn analysis) are commonly performed in "tandem-in-time" instruments, such as quadrupole ion trap mass spectrometers or Fourier Transform/Ion Cyclotron Resonance (FTICR) mass spectrometers.

Several approaches for modifying quadrupole mass filter instruments to perform MSn analysis are presented in the prior art. One such approach involves appending one or more collision cells and quadrupole mass filters to a conventional triple quadrupole instrument. For example, Beauregard et al. (Proc. $34^{th}$ ASMS Conference on Mass Spectrometry and Allied Topics, p. 220) describe a mass spectrometer utilizing five quadrupole rod sets (configured as three quadrupole mass filters and two collision cells). The second quadrupole mass filter is employed to select a first-generation product ion of interest, which is then fragmented in the second collision cell, and a mass spectrum of the resultant second-generation product ions is acquired by scanning the third quadrupole mass filter. However, a mass spectrometer of this description would be complex, bulky and expensive. Furthermore, this approach could not be effectively extended to higher orders of MSn (i.e., $n \geqq 4$), due to the high transmission losses, which would significantly compromise instrument sensitivity and minimum detection levels.

U.S. Pat. No. 6,504,148 to Hager describes a modified triple quadrupole mass filter architecture in which one of the quadrupole rod sets is selectively operable as a quadrupole mass filter or a linear ion trap. When $MS^n$ analysis is desired, the quadrupole rod set is operated as an ion trap so that multiple stages of ion selection and fragmentation may be effected therein. The selected first or subsequent generation product ions are then accelerated into a conventional collision cell where they undergo fragmentation to form second or higher-order product ions. These product ions are then directed through a second quadrupole mass filter for acquisition of a mass spectrum.

Yet another approach is represented by U.S. Pat. No. 6,570,153 to Li et al. and U.S. Pat. No. 7,145,133 to Thomson. In this approach, ions derived from a sample are repeatedly passed through one or more quadrupole mass filters by reversing the direction of ion travel within the instrument. For example, an ion sample may be passed through a quadrupole mass filter in a first direction (i.e., from the inlet end to the outlet end) to select a precursor ion of interest. The selected ions are then accelerated into a collision cell located adjacent to the outlet end of the mass filter to produce first generation product ions. The resultant product ions may then be passed through the quadrupole mass filter in the opposite direction (from the outlet end to the inlet end) by adjusting the DC offsets applied to the collision cell, mass filter, and other ion optical components. The mass filter is operated to selectively transmit a first generation product ion of interest, which is then accelerated into a second collision cell located adjacent to the inlet end for production of second-products. This cycle may be repeated to produce and select higher-order generation product ions; when the desired number of ion selection/fragmentation cycles has been completed, the resultant product ions may then be directed to a detector or to another mass analyzer (e.g., a time-of-flight mass analyzer) to obtain a mass spectrum.

The prior art approaches, while technically feasible, require complex electronics that are difficult to implement reliably, and may otherwise result in instrument design problems or have undesired effects on instrument performance. For example, the quadrupole mass filters of the aforementioned Li et al. and Thomson patents, which are operated in a bidirectional fashion, may exhibit different filtering behavior depending on the direction of ion travel, particularly where rod electrodes having a circular-cross section are utilized to construct the mass filter. Also, in this approach the mass filter and adjacent storage/collision cells are blocked for the entire time of analysis, thus increasing time between scans and potentially aggravating space-charge effects in the pre-storage trap. Against this background, there is a need for a mass spectrometer that provides MSn and other advanced capabilities while avoiding the disadvantages associated with prior art approaches.

SUMMARY

Generally described, a mass spectrometer constructed in accordance with a first embodiment of the invention includes first and second ion selectors (which may take the form, respectively, of first and second quadrupole mass analyzers), a collision cell positioned between the first and second ion selectors, and an ion path switching device. Sample ions are initially directed to an inlet end of the first ion selector, which transmits through an outlet end thereof ions having m/z's within a range of interest. The transmitted ions are then accelerated into a collision cell, where they undergo energetic collisions and fragment into product ions. The product ions are then conveyed to a second ion selector, which transmits ions having m/z's within another range of interest. The ions transmitted through the second ion selector pass into a first ion path switching device, which selectively switches ions between a first ion path leading to the inlet end of the first ion selector, and a second ion path that leads, for example, to a detector. The first and second ion selectors, collision cell, and first ion path switching device collectively define a looped ion path through which ions derived from a sample may be directed multiple times in order to effect the desired number of selection/fragmentation cycles. After all ion selection/fragmentation cycles have been completed, the nth generation product ions may be conveyed (by operation of the ion path switching device) to the detector for acquisition of a mass spectrum.

In accordance with a particular implementation of the first embodiment, a second collision cell having an ion trapping capability may be positioned on the first ion path between the second ion selector and the first ion selector. The second collision cell may function to fragment ions transmitted by the second ion selector, and to retain the fragmented ions while operating parameters (e.g., RF and DC voltages applied to the ion selectors) are adjusted. In another particular implementation, a second ion path switching device, positioned between the first collision cell and the second ion selector, is operable to selectively divert ions on a path toward a mass analyzer, such as a quadrupole ion trap or an electrostatic mass analyzer. In yet another particular implementation, the first ion path switching device may include a quadrupole rod set having auxiliary electrodes interposed between adjacent rod electrodes, wherein the DC voltages applied to the auxiliary electrodes and the RF voltages applied to the rod electrodes are changed to switch between transmission and detection modes.

In a second embodiment, a mass spectrometer includes an ion selector (e.g., a quadrupole mass filter) having an inlet and an outlet end, an ion path switching device, and a collision cell. Sample ions are initially directed to an inlet end of the ion selector, which transmits through its outlet end ions having m/z's within a range of interest. The ions transmitted through the ion selector pass into an ion path switching device, which selectively switches ions between a first ion path leading to a collision cell, and a second ion path that leads, for example, to a detector. Ions directed to the collision cell undergo fragmentation, and the resultant product ions are conveyed to the inlet end of the mass selector. The ion selector, switching device and collision cell collectively define a looped ion path through which ions derived from a sample may be directed multiple times in order to effect the desired number of selection/fragmentation cycles. After all ion selection/fragmentation cycles have been completed, the nth generation product ions may be conveyed (by operation of the ion path switching device) to the detector (or to another mass analyzer, such as a TOF analyzer) for acquisition of a mass spectrum.

DETAILED DESCRIPTION OF EMBODIMENTS

Figure 1:
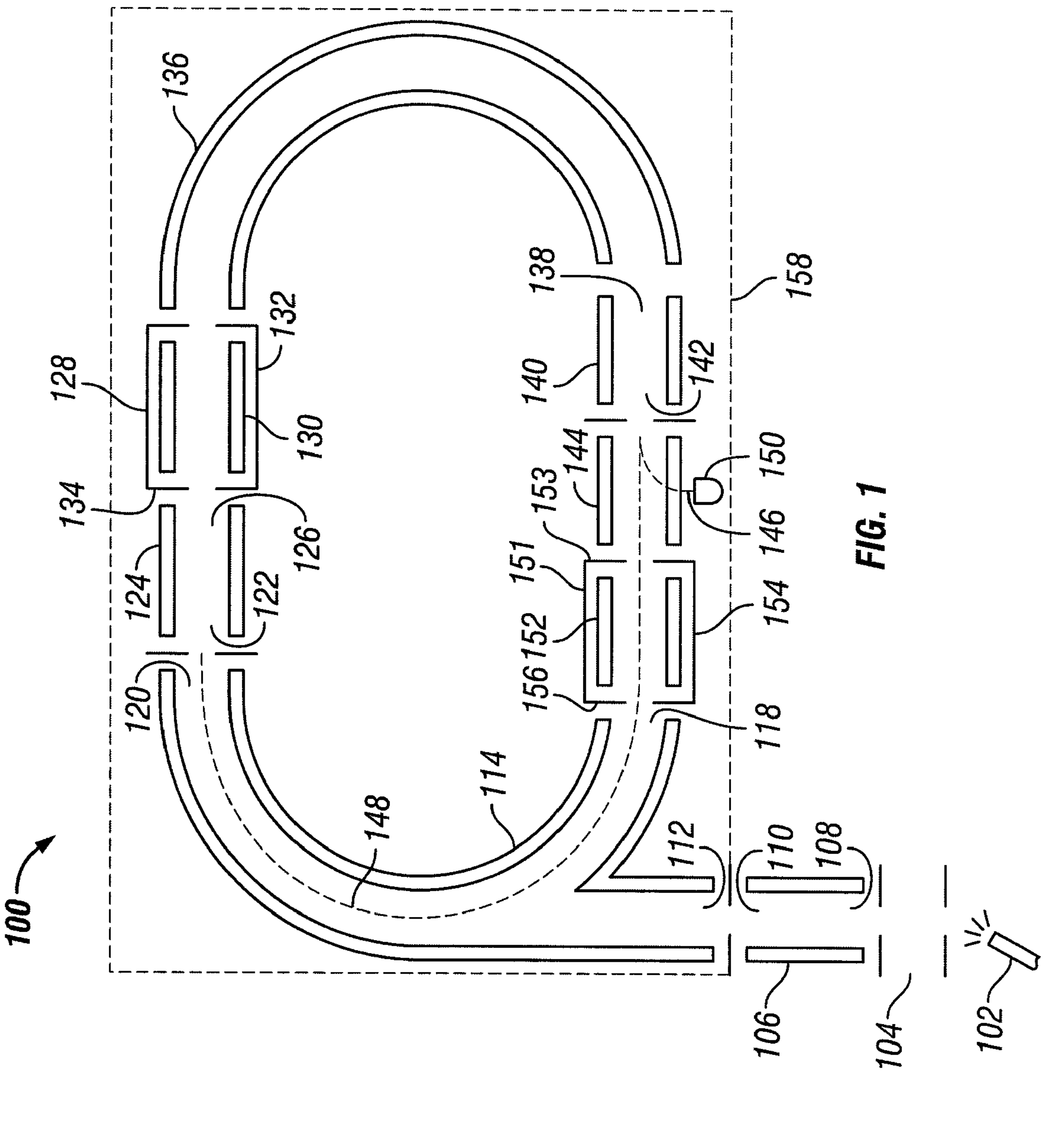
FIG. 1 is a schematic depiction of a mass spectrometer having a looped ion path according to a first embodiment of the invention.

FIG. 1 shows a mass spectrometer 100 constructed in accordance with a first embodiment of the invention. A conventional ion source 102 generates ions from a sample to be analyzed, such as the eluate from a liquid chromatographic column. While an electrospray ionization source is shown as an illustrative example, any other suitable ion source or combination of sources may be employed, including continuous sources such as atmospheric pressure chemical ionization (APCI) and atmospheric pressure photoionization (APPI) sources and pulsed sources such as a matrix assisted laser desorption/ionization (MALDI) source. Ions produced by ion source 102 are transported through an interface region 104, which may include one or more differentially-pumped intermediate chambers of successively lower pressure, and are delivered to an inlet end of ion guide 106. Various ion optics and ion transfer devices, such as electrostatic and RF lenses, ion transfer tubes and ion guides may be disposed within the interface to improve ion transport efficiency and provide separation of solvent, background gas, and other neutrals from the ion stream. Adjacent chambers may be separated from one another by means of apertured partitions, the apertures being sufficient large to permit efficient ion transport therethrough while presenting a flow restriction to the pumps, thereby allowing the development of different pressures within the chambers.

Ion guide 106 may be constructed as a conventional RF multipole ion guide extending from an inlet end 108 to an outlet end 110, with or without an axial field to facilitate ion transport. Outlet end 110 is positioned proximal to a first inlet end 112 of an ion junction 114. As will be described in further detail below, ion junction 114 accepts ions either through first inlet end 112 or a second inlet end 118, and guides the ions to a common outlet end 120 positioned adjacent to an inlet end 122 of a first ion selector 124. Ion junction 114 may be constructed from orthogonally arranged pairs of flat plate electrodes, to which RF voltages are applied in a prescribed phase relationship in order to generate a multipole field that radially confines ions within the ion junction interior volume. In certain implementations, ion junction 114 may be provided with a switching function, whereby the passage to outlet end 120 of ions accepted through first inlet end 112 or second inlet end 118 is selectively allowed or blocked. The switching function may be implemented by employing an electromechanical element, as described in U.S. patent application Ser. No. 11/542,076 entitled "Switchable Branched Ion Guide," the disclosure of which is hereby incorporated by reference. Alternatively, switching may be effected by changing the RF voltages applied to electrode segments of ion junction 114, in the manner described in U.S. patent application Ser. No. 11/373,354 entitled "Branched Radio Frequency Multipole," the disclosure of which is also incorporated by reference.

First ion selector 124 is operable to transmit through its outlet end 126 only those ions having mass-to-charge ratios (m/z's) within a defined range of values. First ion selector 124 is preferably implemented as a conventional quadrupole mass filter, comprising four elongated electrodes to which RF and DC voltages are controllably applied to define the m/z range of transmitted ions. Depending on the type of mass spectrum to be acquired, first ion selector 124 may be operated in a fixed mode, whereby the applied voltages and hence the m/z's of the transmitted ions are maintained constant, or alternatively in a scanned mode, whereby the applied voltages (and m/z's of transmitted ions) are progressively varied over time. For certain experiments, first ion selector 124 may be operated in RF-only mode, whereby no filtering DC voltage is applied, thus allowing transmission of ions having a broad range of m/z's.

Ions transmitted through outlet end 126 of first ion selector 124 are admitted into the interior of a first collision cell 128 through an inlet end thereof. First collision cell 128 may conventionally consist of an RF-only multipole 130 located within an enclosure 132. The interior volume of enclosure 132 is pressurized (via connection to a gas source, not depicted) with an inert collision gas, such as nitrogen or argon. Alternatively, first collision cell may be operated as a reaction cell by introducing a gas selected to react with the ions of interest. Ions entering first collision cell 128 interact with the collision gas and undergo fragmentation to produce product ions. As is known in the art, the degree and pattern of ion fragmentation may be controlled by adjusting the DC offsets applied between first ion selector 124 and RF-only multipole 130 (or between an intermediate ion lens 134 and RF-only multipole 130) to vary the kinetic energies of the ions entering first collision cell 128. To facilitate the transport of ions through first collision cell 128, an axial DC field may be generated within the interior volume of first collision cell 128 by, for example, applying a DC voltage differential to a set of longitudinally arranged resistive rod electrodes.

Ions exiting first collision cell 128 are transported by ion guide 136 to an inlet end 138 of second ion selector 140. While collision cell 128 and ion guide 136 are depicted as separate structures, they may in some implementations be combined into a single unit. Ion guide 136 may be implemented, for example, as a single RF-only multipole or a combination of two or more serially arranged RF-only multipoles. Second ion selector 140 is operable to transmit through its outlet end 142 only those ions having mass-to-charge ratios (m/z's) within a defined range of values, and may take the form of a conventional quadrupole mass filter. In a manner similar to first ion selector 124, second ion selector 140 may be operated in fixed, scanned, or RF-only modes, depending on the type of mass spectrum to be acquired.

Ions transmitted through second ion selector 140 are delivered to ion path switching device 144, which is configured to direct ions along a selected one of a first ion path 146 or a second ion path 148. Details of the design and operation of ion path switching device 144 will be discussed below in connection with FIGS. 2 and 3. Second ion path 148 terminates at a detector 150, which generates a signal representative of the number of ions impinging thereon. This signal is conveyed to and processed by a data acquisition system (not depicted) for generation of the mass spectrum. First ion path 146 extends through a second collision cell 151 and ion junction 114 (via second inlet end 118) and leads to inlet end 122 of first ion selector 124. Second collision cell 151 may take the form of an RF-only multipole 152 disposed within an enclosure 154, the interior of which is pressurized with a collision gas. In alternative implementations, second collision cell 151 may be integrated with ion junction 114 rather than being formed as a separate structure. The kinetic energies of ions entering second collision cell 151 (and consequently the degree of fragmentation) may be controlled by adjusting the DC offsets applied between ion path switching device 144, RF-only multipole 152 and/or an ion lens 153 located between ion path switching device 144 and second collision cell 151. For the reasons set forth below, second collision cell 151 is preferably operable in an ion retention mode, whereby the residence time of ions within its interior volume may be controlled. Operation of second collision cell 151 in the ion retention mode may involve trapping ions (for example, by applying a raised DC voltage to exit ion lens 156 in order to create a potential barrier) or may instead involve the application of an axial DC gradient or other suitable means for controlling the speed at which ions traverse collision cell 151, i.e., without trapping the ions within the collision cell 151 interior.

As may be discerned from FIG. 1, ion junction 114, first ion selector 124, first collision cell 128, ion guide 136, second ion selector 138, ion path switching device 144, and second collision cell 151 define a loop or circuit around which ions derived from a initial ion population may be directed (by operation of ion path switching device 144) two or more times. In this manner, ions derived from the initial ion population are passed at least twice through first and second ion selectors 124 and 138, thereby enabling MSn analysis ($n \geqq 2$) without requiring the incorporation of an additional ion selector. Unlike the approaches described in the aforementioned U.S. Pat. Nos. 6,570,153 and 7,145,133, the direction of ion travel within mass spectrometer 100 does not need to be reversed; instead, the ions make multiple passes through the ion selectors in the same forward direction, i.e., extending from a fixed inlet to a fixed outlet.

Because first and second ion selectors 124 and 138 will typically require relatively low operating pressures to reliably and efficiently perform the ion selection function, the ion selectors as well as other components may be located within a vacuum chamber 158 evacuated by a turbo-molecular pump (not depicted).

Figure 2A:
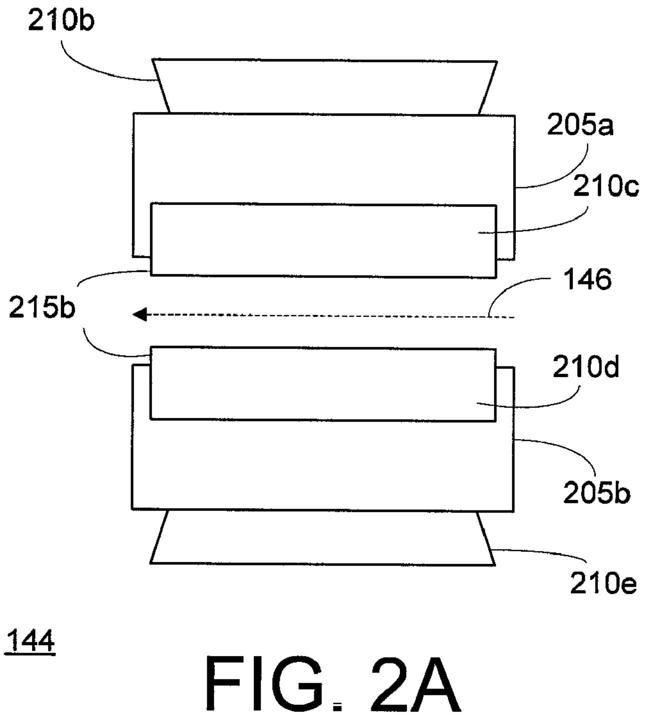
FIGS. 2A and 2B are, respectively, side elevational and lateral cross-sectional views of an implementation of the ion switching device of the FIG. 1 embodiment.
Figure 2B:
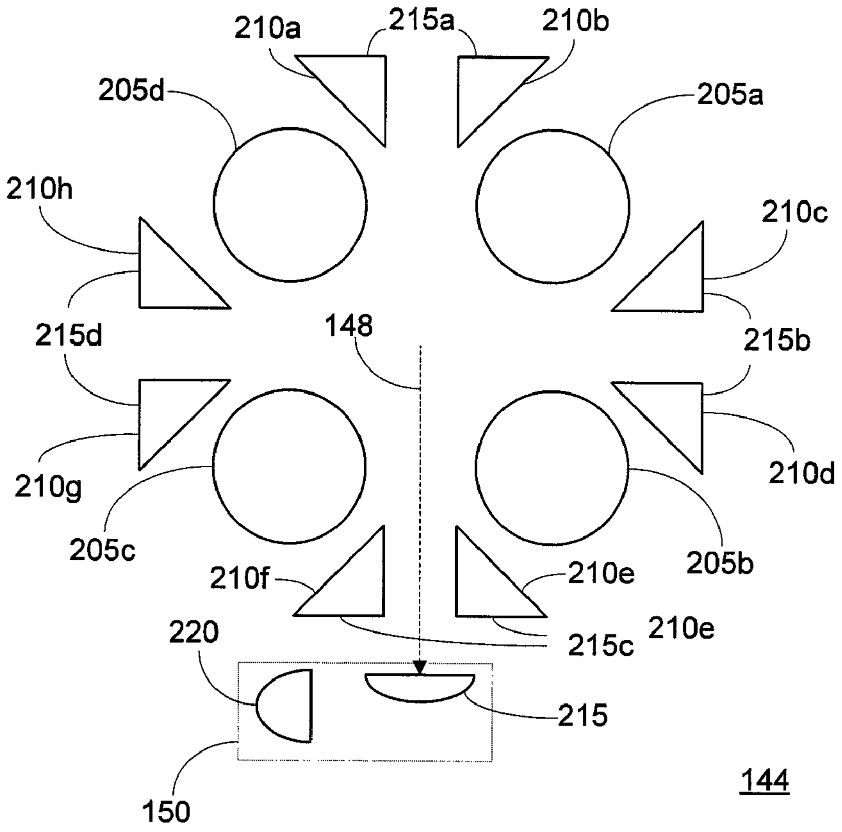

FIGS. 2A and 2B depict (in side elevational and lateral cross-sectional views) a first embodiment of ion path switching device 144. As described above, ion path switching device 144 is controllably operable to switch ions emerging from second ion selector 140 between a second ion path 148 leading to detector 150 (for generation of a mass spectrum) and a first ion path 146 leading to first ion selector 124 (for conducting additional stages of selection and fragmentation). Ion path switching device 144 is constructed from four rod electrodes 205*a-d* arranged into two electrode pairs, each pair being opposed across the device centerline. Rod electrodes

205*a-d* are coupled to a not-depicted oscillatory (e.g., RF) voltage source such that, when ion path switching device 144 is operated in a transmitting mode, each rod pair receives a phase of an oscillatory voltage, e.g., a first rod pair consisting of rod electrodes 205*a* and 205*c* receives the positive phase of the oscillatory voltage, and a second rod pair consisting of rod electrodes 205*b* and 205*d* receives the negative phase of the oscillatory voltage. Application of the oscillatory voltages creates a field that radially confines the ions. Auxiliary electrodes 210*a-h* are arranged into four auxiliary electrode sets 215*a-d*, with each set being interposed between adjacent rod electrodes. The auxiliary electrode sets 215*a-d* are coupled to a not-depicted DC voltage source which supplies identical DC voltages to each of the auxiliary electrode sets when ion path switching device 144 is operated in transmission mode. As shown, ions are transported along first ion path 146 and emerge from an outlet end of ion path switching device 144 when it is operated in transmission mode.

In order to switch to detection mode, the RF voltages applied to rod electrodes 205*a-d* are removed, and the DC voltage(s) applied to at least one of auxiliary electrode sets 215*a* or 215*c* is or are changed to establish a transverse DC field that causes ions to be deflected along second ion path 148 toward detector 150 (as used herein, the term "detector" includes any and all components of a structure that generates a signal representative of the number of ions incident thereon; in the present example, detector 150 includes a conversion dynode 215 coupled to an electron multiplier 220). In one example, identical DC voltages are applied to auxiliary electrode sets 215*a*, 215*b* and 215*d*, while a different DC voltage is applied to auxiliary electrode set 215*c*. The DC voltage applied to conversion dynode 215 and/or rod electrodes may also be adjusted to influence the transport of ions to detector 150.

Figure 3A:
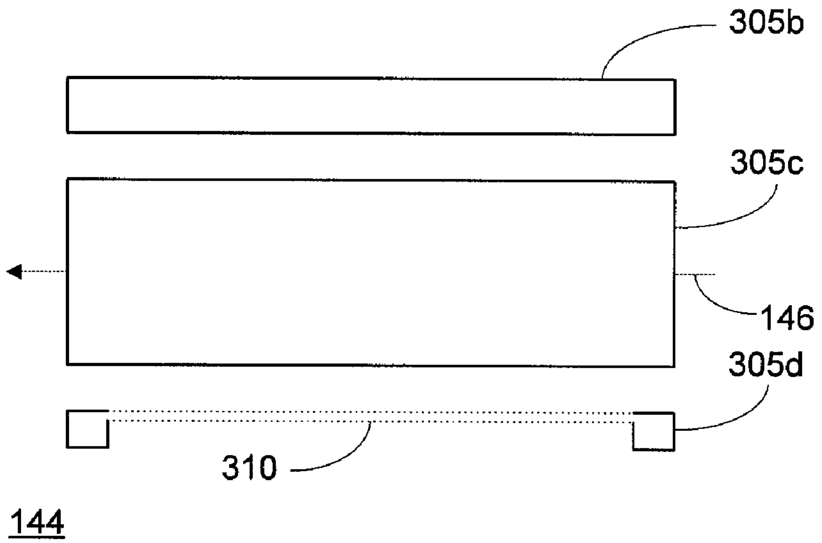
FIGS. 3A and 3B are, respectively, side elevational and lateral cross-sectional views of an alternative implementation of the ion switching device.
Figure 3B:
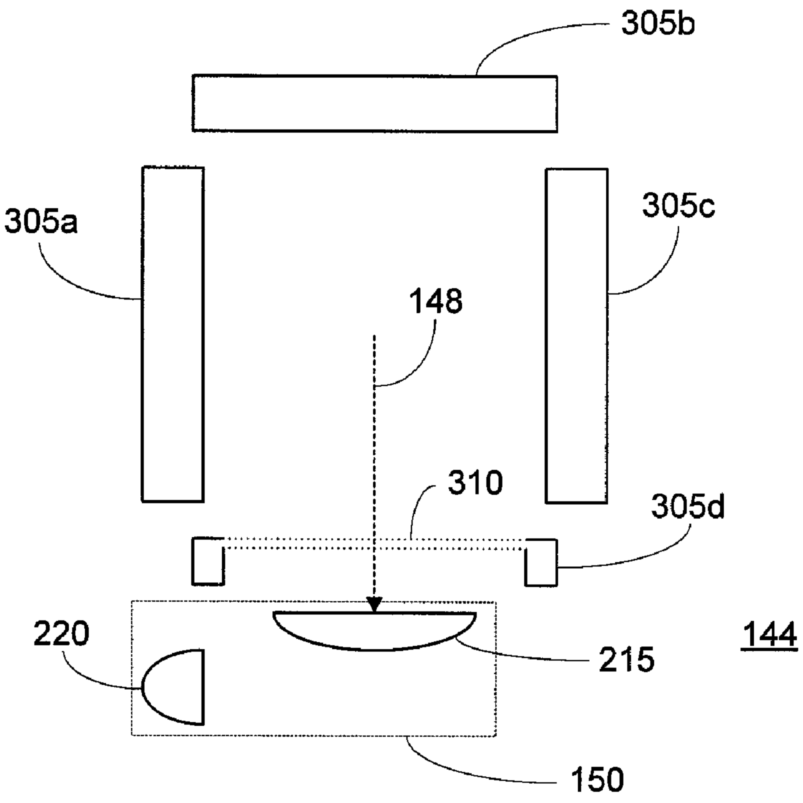

FIGS. 3A and 3B depict (in side elevational and lateral-cross-sectional views) a second embodiment of ion path switching device 144, which takes the form of four generally planar electrodes 305*a-d* coupled to RF and DC voltage sources (not shown). Electrodes 305*a-c* may be substantially identical in their construction, while a central portion 310 of electrode 305*d* is formed from a conductive mesh or is adapted with an array of apertures that define a set of passageways extending through the thickness of electrode 305*d*. Electrodes 305*a-d* are arranged into a quadrupole structure comprising two pairs of opposed electrodes. When ion path switching device 144 is to be operated in a transmission mode, oscillatory (e.g., RF) voltages are applied in a prescribed phase relationship to electrodes 305*a-d*, with one electrode pair receiving a voltage opposite in phase to the other electrode pair. As known in the art, this creates an oscillatory field that radially confines ions, causing the ions to be transported along first ion path 146 and to thereafter emerge from an outlet end of ion path switching device 144.

To switch to detection mode, the RF voltages applied to electrodes 305*a-d* are removed, and suitable DC voltage(s) are applied to at least some of the electrodes to establish a transverse DC field that causes ions to be deflected along second ion path 148 toward detector 150. The deflected ions traverse the passageways extending through the central portion 310 of electrode 305*d* and strike conversion dynode 215. In one example, deflection of ions along second ion path 148 is accomplished by applying identical DC voltages to electrodes 305*a*, 305*b* and 305*c*, and applying a DC voltage of equal magnitude and opposite polarity to electrode 305*d*. Again, the DC voltage applied to conversion dynode 215 may also be adjusted to influence the transport of ions to detector 150.

It should be recognized that the embodiments described above and depicted in FIGS. 2A,B and 3A,B are intended to be illustrative rather than limiting. Those skilled in the art will recognize that other structures and techniques may be utilized for ion path switching, including, for example, the branched ion guides disclosed in the aforementioned U.S. patent application Ser. Nos. 11/542,076 and 11/373,354.

The operation of mass spectrometer 100 may be more easily understood in connection with its use for a specific experiment. In one illustrative example, mass spectrometer 100 may be employed for an MS3 selective reaction monitoring (SRM) experiment characterized by the transition A→B→C, where A, B and C are the m/z's of, respectively, a precursor ion of interest, a first-generation product ion of interest, and a second-generation product ion of interest. An experiment of this general description may be useful, for example, to identify metabolites with high specificity by selecting values of B and C that correspond to known first-generation and second-generation products derived from the metabolite ion. Because a conventional triple quadrupole mass analyzers is limited to a single fragmentation stage, it would not be capable of performing such an experiment. Ions generated by ion source 102 and transported through interface 104 and ion guide 106 are admitted through first inlet end 112 of ion junction 114 and are conveyed to inlet 122 of first ion selector 124. First ion selector 124 is operated (e.g., by setting appropriate RF and DC voltages) to transmit only ions having a narrow range (e.g., 1 amu/unit charge wide) of m/z's centered on A. The transmitted precursor ions are then accelerated into first collision cell 128 and undergo energetic collisions with the collision gas to cause at least a portion of the precursor ions to fragment into first-generation product ions.

The first-generation product ions exit first collision cell 128 and are conveyed by ion guide 136 to inlet 138 of second mass selector 140. Second ion selector 140 is operated to transmit only those ions having a narrow range of m/z's centered on B. The transmitted first-generation product ions then pass into ion path switching device 144, which is operated to direct ions along first ion path 146 into second collision cell 151. The ions enter collision cell 151 with high kinetic energies (via adjustment of the applied DC offsets) and at least a portion of the ions are fragmented into second-generation product ions. Second collision cell 151 is operated in a retention mode, such that the residence time of second-generation ions within the interior volume of the collision cell is controlled by trapping or regulating the speed at which the ions move through the collision cell. During or prior to formation of second-generation product ions in second collision cell 151, the flow of ions from ion source 102 is stopped by, for example, raising a DC potential applied to a lens situated between ion source 102 and first inlet end 112 of ion junction 114, or operating a switch element within ion junction 114 to block the flow of ions from first inlet end 112.

The second-generation product ions are retained within second collision cell 151 for a residence time of sufficient duration to adjust and stabilize the RF and DC voltages applied to the ion selectors, the accelerating DC offsets applied between the collision cells and their corresponding upstream components, and the state of ion path switching device 144. Typically, the time required for adjustment and stabilization at the new RF and DC voltages will be about 1-2 milliseconds.

In the present example, while the second-generation ions are trapped or traveling through second collision cell 151, the RF and filtering DC voltages applied to first ion selector 124 are set to transmit only those ions having a narrow range of m/z's centered on C; the DC offsets applied between first ion selector 124, entrance ion lens 134 and/or RF-only multipole 130 are set to maintain the kinetic energies of ions entering first collision cell at values that yield no or minimal fragmentation within first collision cell 128; the filtering DC voltage is removed from second ion selector 140 so that second ion selector transmits ions within a broad range of m/z's; and, ion path switching device 144 is set to direct ions along second ion path 148 to detector 150.

Second-generation product ions emerging from collision second collision cell 151 flow through second inlet end 118 into ion junction 114. The ions are then transported through ion junction 114 and delivered to inlet 122 of first ion selector 124. As described above, first ion selector 124 is operated (during the "second pass" of ions therethrough) to transmit only ions having a narrow range of m/z's centered on C. The transmitted ions are passed at relatively low velocity into first collision cell 128. The ions traverse the length of first collision cell 128 without undergoing significant fragmentation, and are conveyed by ion guide 136 to inlet 138 of second ion selector 140. As noted above, second ion selector 140 is operated (during the second pass) in RF-only mode, such that it transmits ions in a broad range of m/z's and does not provide a filtering function. The ions transmitted through second ion selector 140 pass to ion path switching device 144, which is operated to direct the transmitted ions along first ion path 146 to detector 150. Detector 150 generates a signal responsive to impingement of ions thereon, and the signal (indicative of the detection of the molecule of interest) is transmitted to the data acquisition system for processing.

The foregoing example is intended to illustrate one representative example of how the capabilities of mass spectrometer 100 may be utilized. By appropriate operation of the various components of mass spectrometer 100, a large number of different types of experiments may be conducted, including without limitation product ion scans, precursor ion scans, neutral loss scans, and multiple reaction monitoring. Mass spectrometer 100 also provides the ability to combine in ion junction 114 n-th generation product ions (trapped and released from second collision cell 151 with precursor ions (conveyed from ion source 105), so that a mass spectrum may be obtained of an ion population having both precursor and product ions.

Figure 4:
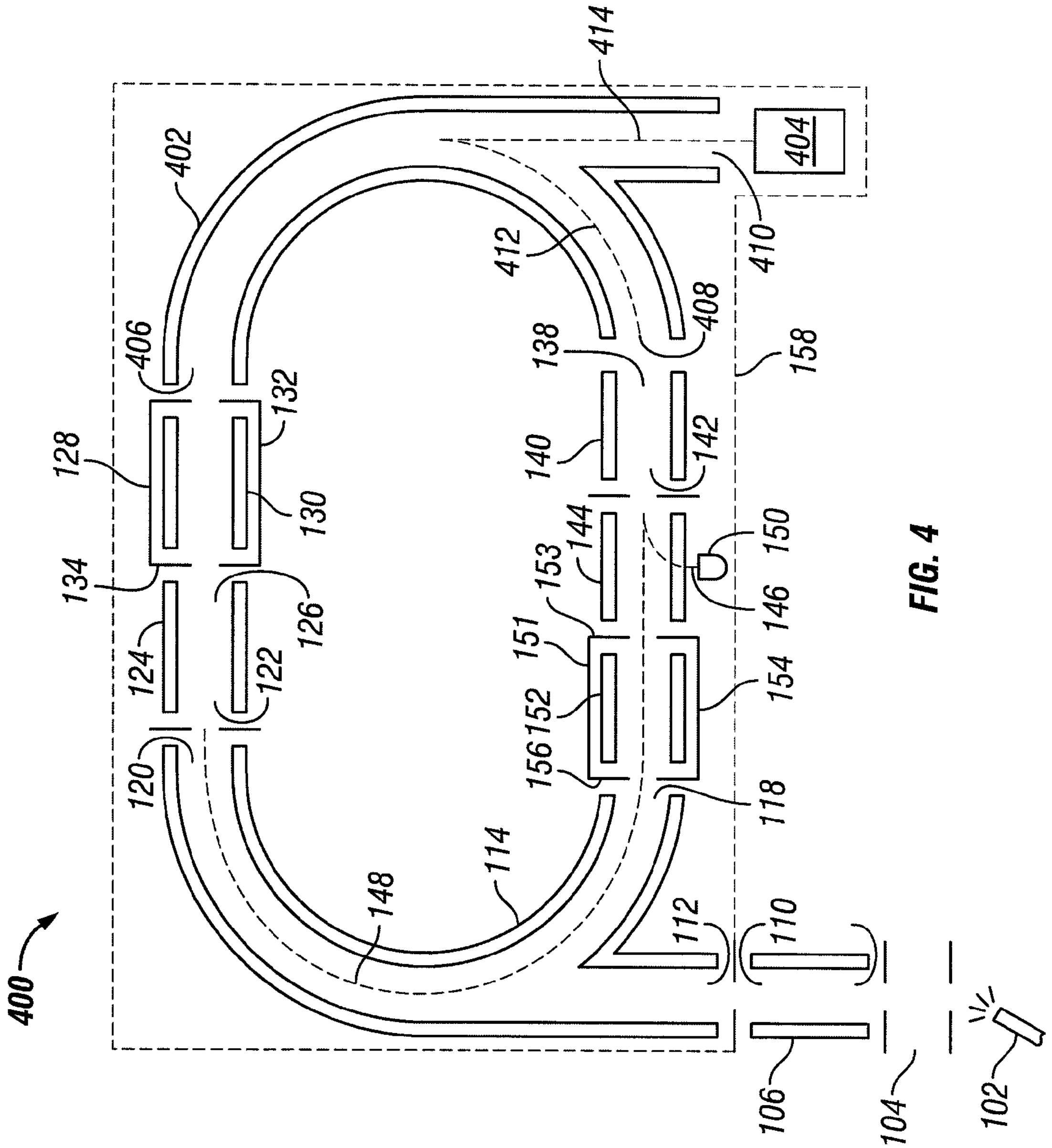
FIG. 4 is a schematic depiction of a variant of the FIG. 1 embodiment, which adds a second ion switching device and a mass analyzer.

FIG. 4 depicts a mass spectrometer 400, which is a variant of the first embodiment described above. Mass spectrometer 400 is closely similar in design and operation to the FIG. 1 embodiment, with the major distinction being the addition of a second ion path switching device 402 and a mass analyzer 404. Ion path switching device 402 has an inlet 406 that receives ions from first collision cell, and first and second outlet ends 408 and 410 respective coupled to second ion selector 140 and mass analyzer 404. Mass analyzer 404 may be of any suitable type, including without limitation a two- or three-dimensional ion trap mass analyzer, an Orbitrap mass analyzer, or a time-of-flight (TOF) mass analyzer. Ion path switching device 402 is operable to selectively direct ions on a path 412 leading to second ion selector 140 or on a path 414 leading to mass analyzer 404. Switching between paths may be effected, for example, using one of the techniques disclosed in the aforementioned U.S. patent application Ser. Nos. 11/542,076 and 11/373,354. When ions are directed along path 412, mass spectrometer 400 operates in a manner substantially identical to the FIG. 1 mass spectrometer. Mass analyzer 404 may be employed to provide capabilities that are not available to the FIG. 1 mass spectrometer, e.g., enhanced or different dissociation types, such as electron transfer dissociation (which is advantageously performed in a two-dimensional ion trap mass analyzer) or the acquisition of accurate mass or very high resolution mass spectra (which may be attained by using an Orbitrap or FTICR analyzer as mass analyzer 404).

Figure 5:
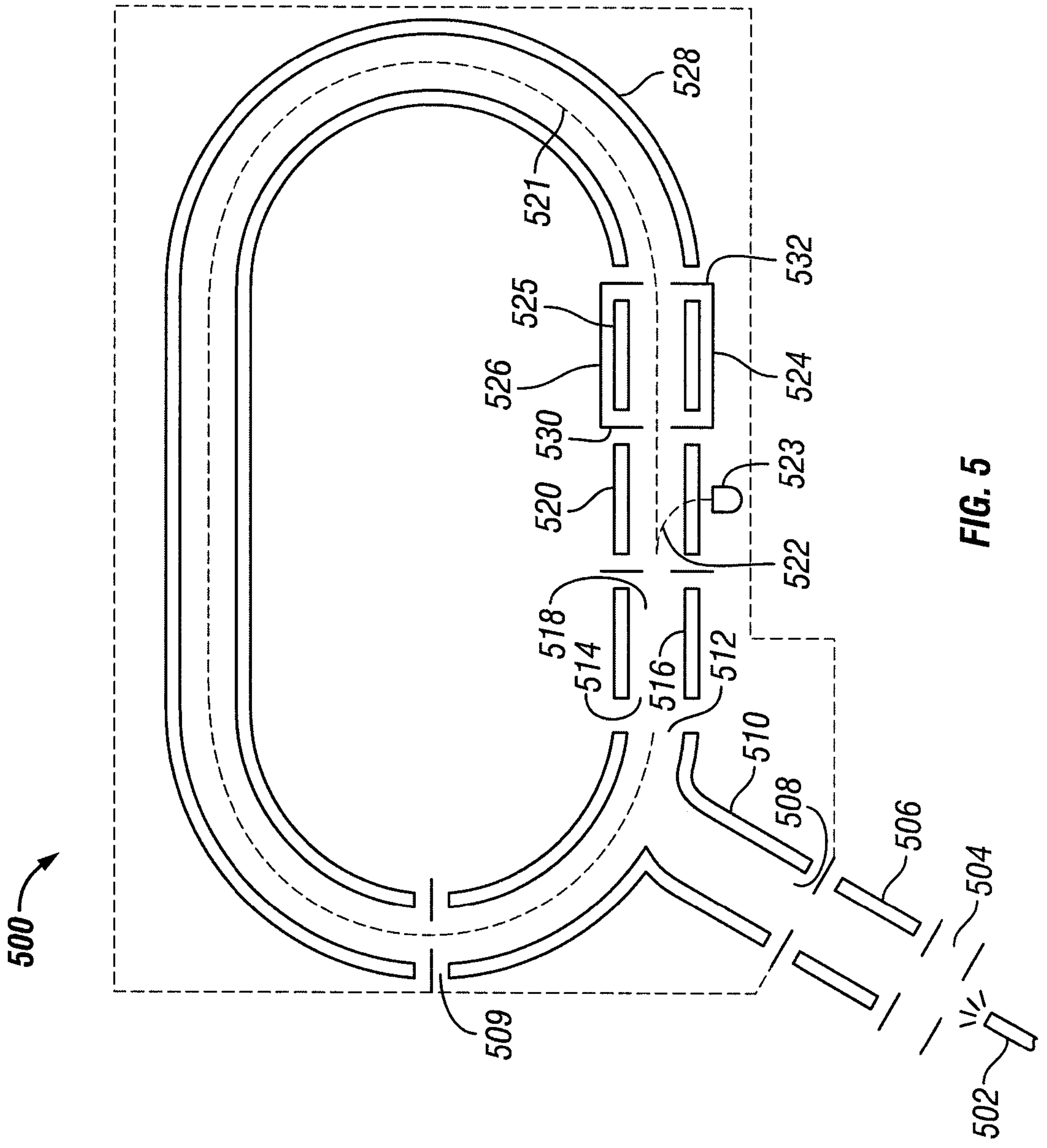
FIG. 5 is a schematic depiction of a mass spectrometer having a looped ion path, constructed according to a second embodiment of the invention.

FIG. 5 depicts a second embodiment of the present invention, which provides a mass spectrometer 500 having a looped geometry similar to the FIG. 1 embodiment, but which utilizes only a single mass selector. Ions generated by ion source 502 are transported through an interface region 504 and are delivered to an inlet end of ion guide 506, and thereafter to a first inlet end 508 of an ion junction 510. Ion junction 510 may have a construction similar to ion junction 114 of the FIG. 1 embodiment, and may be provided with a switching function, whereby the passage to outlet end 512 of ions accepted through first inlet end 508 or second inlet end 509 is selectively allowed or blocked.

First ion selector 514 is operable to transmit through its outlet end 518 only those ions having mass-to-charge ratios (m/z's) within a defined range of values. First ion selector 514 is preferably implemented as a conventional quadrupole mass filter. Depending on the type of mass spectrum to be acquired, first ion selector 514 may be operated in a fixed, scanned or RF-only mode.

Ions transmitted through outlet end 518 of first ion selector 514 are passed to ion path switching device 520, which is configured to direct ions along a selected one of a first ion path 521 or a second ion path 522. Ion path switching device 520 may be of any suitable design, including but not limited to the designs depicted in FIGS. 2A,B and 3A,B and discussed above. Second ion path 522 terminates at a detector 523, which generates a signal representative of the number of ions impinging thereon. This signal is conveyed to and processed by a data acquisition system (not depicted) for generation of the mass spectrum. First ion path 521 extends through collision cell 524, ion guide 528, and ion junction 510 (via second inlet end 509) and leads to inlet end 514 of ion selector 516. Collision cell 524 may take the form of an RF-only multipole 525 disposed within an enclosure 526, the interior of which is pressurized with a collision gas. In certain implementations, collision cell 524 may be structurally integrated with ion guide 528. The kinetic energies of ions entering collision cell 524 (and consequently the degree of fragmentation) may be controlled by adjusting the DC offsets applied between ion path switching device 520, RF-only multipole 525 and/or an entrance lens 530 located between ion path switching device 520 and RF-only multipole 525. Collision cell 526 is preferably operable in an ion retention mode (for example, by raising the DC potential applied to exit lens 532 or adjusting an axial DC field gradient), so that product ions may be retained therein for a specified residence time while voltages applied to the various components are set and stabilized for the next pass of ions through the mass selector.

In mass spectrometer 500, the loop or circuit (through which ions derived from the initial ion population may be repeatedly passed for MSn analysis) is defined by ion selector 516, ion path switching device 520, collision cell 524, ion guide 528, and junction 510. In contradistinction to the FIG. 1 embodiment, only a single selection/fragmentation cycle is produced on each pass, so MSn experiments in mass spectrometer 500 will require more passes relative to their implementation in mass spectrometer 100 of FIG. 1. On the other hand, this embodiment requires only one ion selector for experiments normally requiring multiple mass selectors.

In the foregoing embodiments, it is beneficial to minimize the ions' residence time in each collision cell and in the transfer ion optics (e.g., ion guides 106 and 506) because excessive residence times will lead to m/z discrimination caused by space charge effects. For example, in a modern ion source, ion flux during an LC/MS experiment could easily reach 500-1000 million ions/second, which will load the ion transport optics with ~10 million ions in just 10-20 ms. For typical multipole ion guides, this might lead to increase of ion energies by many eV that in turn leads to m/z-dependent ion loss, fragmentation, spatial fractionation, etc. Therefore, the maximum residence time in the ion transport optics should be significantly shorter than 10-20 ms, preferably <5 ms, to avoid or minimize the aforementioned space charge-related problems.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for analyzing ions, comprising steps of:

admitting ions into a fixed inlet end of a first ion selector comprising a first quadrupole mass filter and transmitting through a fixed outlet end thereof only those ions having mass-to-charge ratios within a first selected range;

fragmenting the ions transmitted through the first ion selector to produce product ions;

admitting the product ions into a fixed inlet end of a second ion selector comprising a second quadrupole mass filter and transmitting through a fixed outlet end thereof only those ions having mass-to-charge ratios within a second selected range;

selectively directing the ions transmitted through the second ion selector, or ions derived from the transmitted ions, on a first or a second ion path, the first ion path extending to the fixed inlet end of the first ion selector;

combining the ions transmitted through the second ion selector, or ions derived therefrom, with an ion population including corresponding precursor ions; and admitting the combined ions into the first ion selector through the fixed inlet end of the first ion selector;

wherein ions traverse the first and second ion selectors only in a forward direction extending from the respective fixed inlet ends to the fixed outlet ends.

2. The method of claim 1, further comprising a step of detecting ions directed on the second ion path.

3. The method of claim 1, wherein the step of selectively directing the ions transmitted through the second ion selector includes fragmenting the ions directed on the first ion path before admitting them into the first ion selector.

4. The method of claim 1, further comprising a step of selectively directing the product ions to a mass analyzer separate from the first and second ion selectors.

* * * * *